Dec. 13, 1960   E. L. OLIVER, JR., ET AL   2,964,194
FILTER CONSTRUCTION
Filed April 17, 1957   2 Sheets-Sheet 1

INVENTORS
Edwin L. Oliver, Jr.
Dwight Richards
BY Robert R. Fine
ATTORNEY

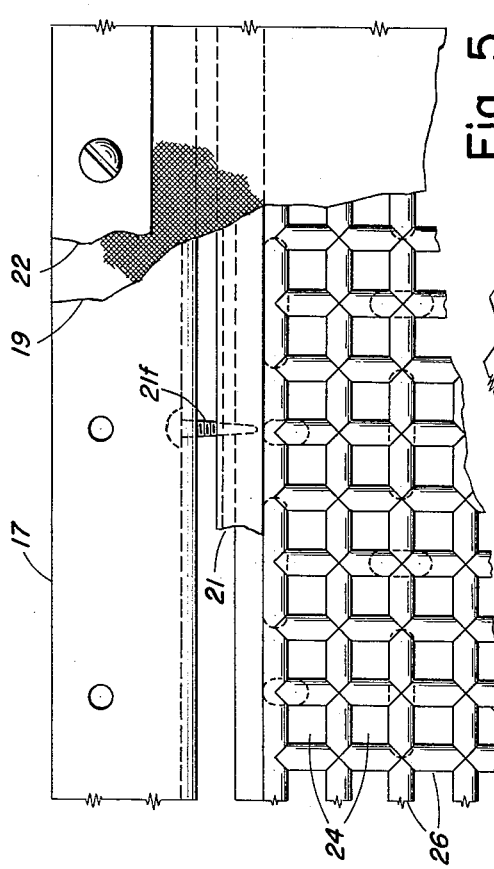
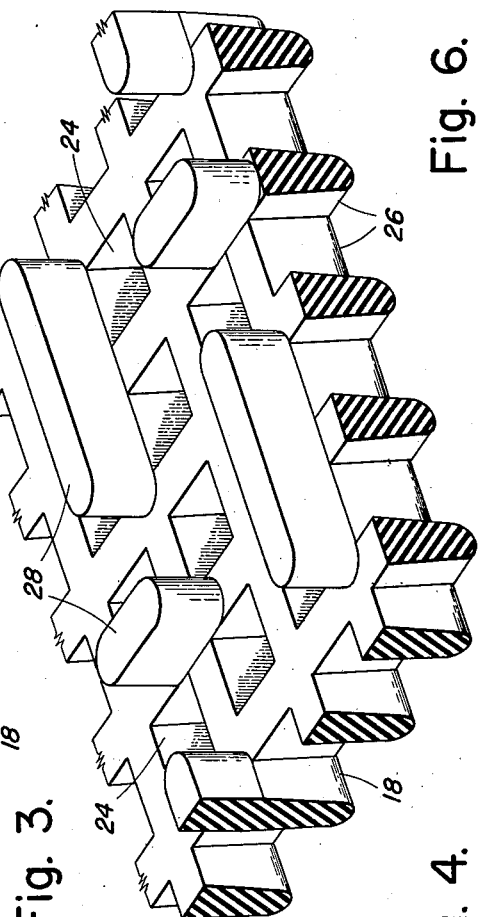
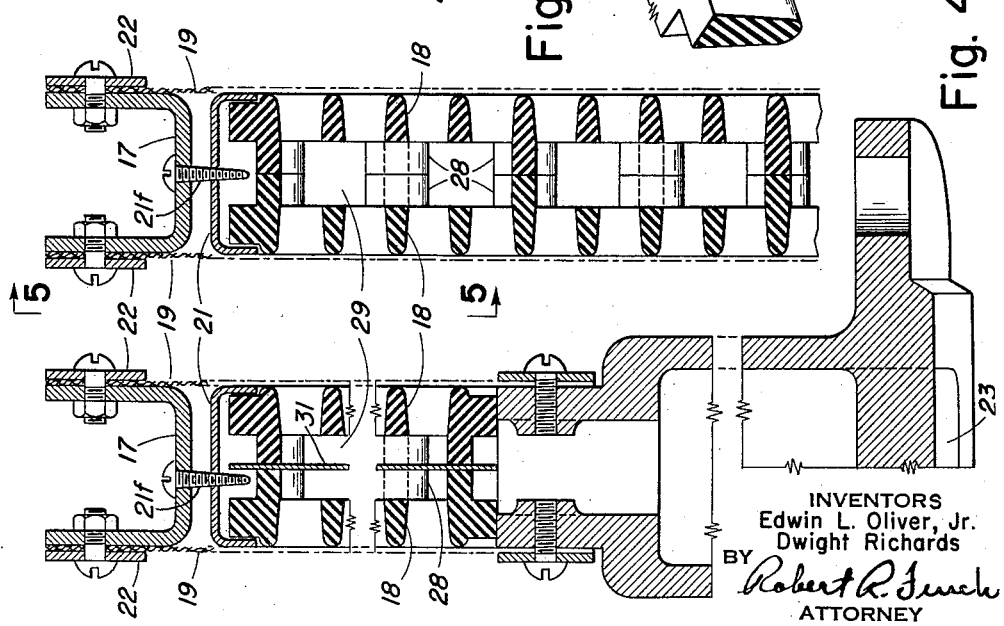
INVENTORS
Edwin L. Oliver, Jr.
Dwight Richards

United States Patent Office 2,964,194
Patented Dec. 13, 1960.

2,964,194

FILTER CONSTRUCTION

Edwin L. Oliver, Jr., Darien, Conn., and Dwight Richards, Orinda, Calif., assignors to Dorr-Oliver Incorporated, Stamford, Conn., a corporation of Delaware Filed Apr. 17, 1957, Ser. No. 653,364

4 Claims. (Cl. 210—486)

This invention relates to filters and in particular to an improved structure for supporting the filter medium while providing positive increased drainage therethrough.

In filters of the so-called leaf type, such as the American Disc Filter or pressure differential filters of various types, a filter leaf is generally constructed as a more or less hollow structure with a filter medium over the outside. Supporting the filter medium and covering the hollow leaf structure, there is usually provided a perforated metal plate or a wire screen usually referred to as a drainage grid. In such filters, the filtrate passes through the filter media and is recovered after discharge from the interior of the leaf while the solids are recovered as a filter cake that builds up on the surface of such leaf.

Although such filter leaves have been in use for many years and have given generally satisfactory results, they are still not all that is to be desired for a variety of reasons. One disadvantage causing considerable difficulty is the lack of rapid drainage from the underside of the filter cake through the filter medium to the interior of the leaf structure. The rate of drainage from the underside of the cake limits the capacity of the filter leaf in terms of its solids handling capacity per unit time. A chief difficulty contributing to such inadequate drainage is the fact that in order to provide adequate support for the filter medium the open or free area of the supporting grid is limited, usually being less than about 40%. Another factor contributing to low drainage rate is the fact that the liquid or filtrate removed from the underside of the filter cake on the inside of the leaf, drains down the inner surface of the leaf, thus effectively interfering with drainage through those portions of the leaf over which the liquid is flowing on its way to discharge.

It is a primary object of the present invention to provide improved ways and means enabling increased drainage rates through a filter leaf. Another object is to provide a filter leaf structure capable of supporting a filter medium in a uniform manner, yet possessing a high open area.

Still another object is the provision of a filter leaf, and a method of filtration, by which filtrate draining through the cake into the interior of the leaf is immediately conducted away from the inner surface of the leaf, thereby eliminating any encumbrance to flow that filtrate drainage on the inner surface of the leaf might present.

A still further object is the provision of a drainage support structure possessing the above described characteristics and capable of extremely rapid drainage with a resultant high capacity while providing uniform support for the filter medium.

Another object is to provide a filter leaf having a high drainage rate and improved positive blowback characteristics enabling rapid removal of the cake from the leaf surfaces.

A still further object is to provide a filter leaf possessing the above mentioned desirable characteristics yet simple of construction and maintenance.

Briefly the foregoing and possibly other objects of the invention are attained by a construction in which the drainage grid or support comprises a plurality of adjacent open spaces, each of which defines a separate drainage area and passage by virtue of confining walls which form conduits that lead away from the inner surface of the filter medium into a filtrate receiving space in the interior of the leaf that is remote from the filter medium. The peripheral edges of these adjacent conduits collectively provide support for the filter medium. Effective positive drainage is insured by virtue of contact of the conduit wall edges with the inner surface of the filter medium. This actually creates a number of separate filter areas and enables the conduits to immediately conduct filtrate away from the underside of the filter medium toward the center of the leaf.

In such filter leaf a center space for conducting filtrate to a final discharge opening is provided by constructing the support as two separate pieces with staggered spacers separating them at their bottom or interior faces thus creating a substantially open central filtrate-receiving space.

In a particular embodiment of the invention, the leaf is provided with a central solid divider plate upon which the drainage grids are supported by spacers or legs which may be integral with such grids. In such a construction, two separate filtrate receiving spaces are thus provided as discussed in more detail hereinafter.

The drainage grid may take a variety of forms. However, in accordance with the invention a preferred form comprises a waffle-like structure that is molded, cast or stamped from hard rubber, plastic or metal.

In order that the invention may be more readily understood and carried into effect, reference is made to the accompanying drawings forming a part of this specification which illustrate, by way of example only, a modification of the invention. The following description, therefore, is not to be taken as limiting the invention, the scope of which is defined by the appended claims rather than by the description preceding them.

In the drawings:

Figure 3 is a partial sectional view taken in the plane of line 3—3 of Figure 2.

Figure 4 is a partial side sectional view of a particular modification of the invention.

Figure 5 is an enlarged partial plan view of the filter leaf showing details of construction, certain elements being shown in broken lines for clarity.

Figure 6 is an enlarged perspective view of the section of the filter drainage grid of the invention.

Figure 1:
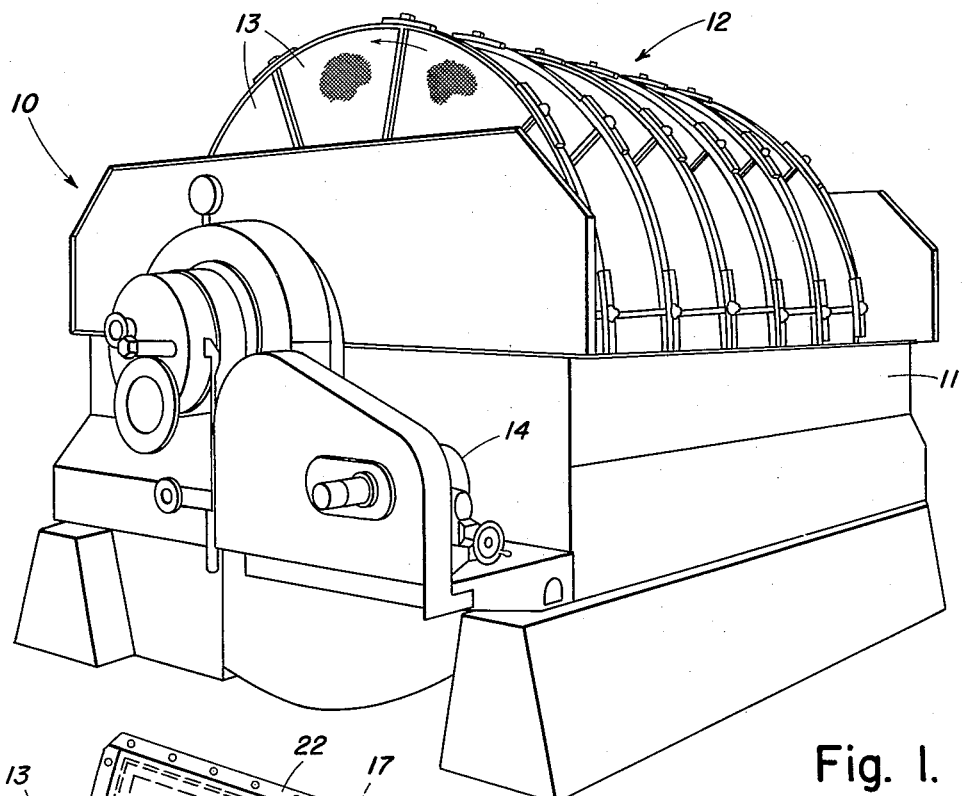
Figure 1 is a perspective view of a disc type filter such as the so-called American filter showing an environment for filter leaves embodying the invention.

In the drawings, there is illustrated generally a disc type filter 10 having a tank 11 that, in accordance with the usual operation of such filters, contains the slurry to be filtered and also mechanism for collecting discharged filter cake as well as means for discharging filtrate. Since such elements are well-known no detailed description thereof is submitted.

In the usual construction, the filter discs 12 are made up of a plurality of filter leaf sectors 13. The entire disc is mounted on a filter shaft, not shown, which is in turn rotated by a prime mover 14 having suitable gear reducing mechanism. The direction of movement may be as indicated by the arrow and, in accordance with a usual mode of operation, vacuum is applied to the leaves during their submergence in the filtrant whereby a filter cake is built up on both surfaces of the leaf, the filtrate being drawn into the interior of the leaf and subsequently discharged. The vacuum is continued until the leaf travels to a discharge point above a cake receiving hopper at which time vacuum is released and, if desired, positive pressure applied to the interior of the leaf to blow off the cake. This cycle is continuously repeated.

Filtrate removed is, as noted above, carried into the center of the leaf thence to the discharge opening. Discharge of such filtrate is aided by gravity as the disc rotates through the upper portion of its travel.

Referring specifically to Figures 2 through 6, it will be noted that the particular construction of the invention illustrated comprises a filter leaf sector 13 consisting generally of a main frame 17 in which is fitted a grid 18. As shown particularly in Figures 3 and 4 the grid 18 may be of two pieces and indeed for ease of construction is desirably of two pieces. Overlying the grid is a conventional filter medium 19.

Figure 2:
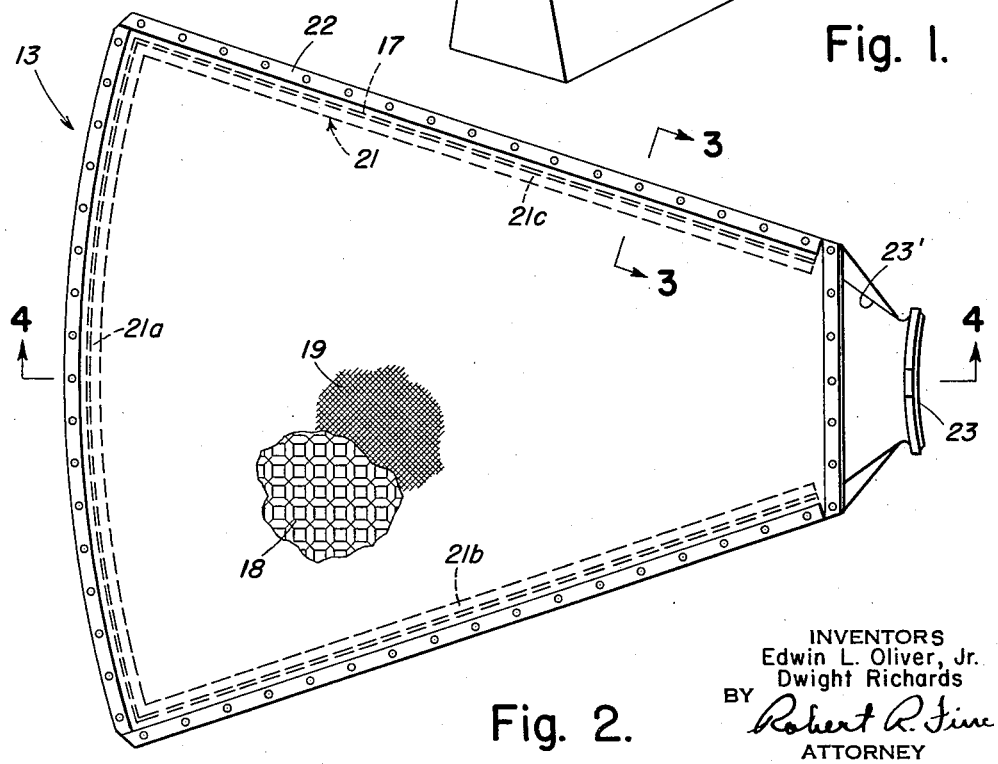
Figure 2 is a plan view of a filter leaf constructed in accordance with the invention a portion being cut away and certain elements shown in broken lines for purposes of clarity.

As shown in Figures 3 and 4 an auxiliary frame 21 is employed to hold the grids in place within frame 17. This frame as shown in Fig. 2 is of channel shaped profile, and may comprise an intermediate peripheral curved portion 21$^a$ and a pair of converging radial end portions 21$^b$ and 21$^c$. Retaining means as between this auxiliary frame 21 and the main frame 17 are shown in detail Figs. 3 and 4 as comprising a holding screw member 21$^f$. Fastening means such as indicated at 22 may be used to hold the filter medium in place upon the main frame structure 17.

It will be noted that the grid substantially fills frame 17 and terminates adjacent a discharge opening 23 which is conveniently sloped as at 23' to enhance drainage.

It will be noted that the grid structure is such that a plurality of open areas 24 are provided. Such areas being defined by supporting peripheral walls 26. In other words, the grid comprises a plurality of adjacent open-ended elongated conduits the peripheral free edges of which at one (the outer) ends provide support for the filter medium while the other ends of the conduits terminate in the interior of the leaf remote from the underside of the filter medium. In the particular construction illustrated, the leaf is made up from two grid sections each of which is provided with spacer legs 28 which are staggered in such a manner that there is provided a substantially clear central filtrate receiving space 29 of area co-extensive with that of the leaf.

It will be noted in particular that the grid structure provides supporting walls 26 having a substantial vertical depth thus forming elongated conduits through which filtrate is immediately conducted from the inner surface of the filter medium 19 into the central draining space 29. Since vacuum is continuously applied during filtration and drainage, filtrate is prevented from thereafter contacting the inner surface of the filter medium. This insures uniform drainage across the entire filter area and prevents filtrate from flowing across the inner surface of the medium.

In addition to providing a remote drainage system (remote in the sense that it is spaced from the inner surface of the filter media) the leaf construction also improves on the blowback characteristics of the leaf.

In the modification illustrated in Figure 4, additional drainage aid is received from a central plate 31 which serves to divide space 29 into two distinct sections. As shown in Figure 4 this plate is substantially co-extensive in area with the frame 17 and extends to a point directly adjacent the discharge opening 23. Thus, if for some reason the cake is not readily built up on both sides of the filter leaf, the turbulent action which may occur adjacent the portion on which no cake has formed is isolated from the other side of the leaf. In blowback and backwashing operations, central plate 31 serves to immediately divide the backflow of air or backwash liquid and divert such flow into separated sections of the leaf. This serves to minimize any differences in operation such as may be brought about by different local conditions on the leaf surface during cake removal or backwash.

The grid itself may be made from a number of materials; however, it is a general object of the invention that it be readily moldable or castable thus providing a construction of extremely low cost. The material used for the grid should be selected from a material capable of withstanding contact with the material undergoing treatment. A grid suitable for many uses has been found to be one molded of hard rubber. With respect to the grid itself, construction should be such that the open area is within the range of from 40–60% thus providing a maximum drainage area. In connection with the free or open area of the grid, it is to be noted that the upper edges thereof are rounded thus providing a line contact with the filter media and providing even more free area adjacent the under surface of the media for initial drainage. It is also important that the spacers or legs 28 be spaced apart within central space 29 in such a manner that substantially free drainage of filtrate is not impeded.

To insure uniformity and economy of structure, legs 28 should be molded as integral parts of the grid. It is also noted that the preferred construction is to mold the grids in uniform sections so that when the grids are fitted into place on opposite sides of the leaf, the legs mate with each other thereby providing the spacing between grids and defining the central drainage space. When employing the central plate 31, spacing of the legs is not so important as the plate serves as a support.

Another modification, not shown in the drawings, is to make legs 28 of sufficient length that they extend clear across central space 29. Such structure has the advantage that the legs, if any, on the opposite grid section need not be in identical position since the extra long legs will support both grid sections in spaced apart relationship.

In a test installation, a leaf structure embodying the modification illustrated in Fig. 4 was employed on a filter of the type shown in Fig. 1. For purposes of comparison only one disc employed the new filter leaf construction and the other discs employed the conventional construction of wooden slats serving as the support members. In the test, material being filtered comprised a copper ore concentrate. The filter cake built up on the old type leaves was ⅜" thick while the cake built up on the leaf construction of the invention was ¾" thick, yet of substantially equal moisture content. Thus, it is seen that the new construction, under identical operating conditions, has twice the filtering capacity of the old structure yet at no sacrifice in quality of cake.

The grid construction herein described is not limited to use in the exact type of filter leaf shown, for it is obvious that any filter requiring interior drainage will be improved by employing the construction provided by the invention.

We claim:

1. In a filter, the combination which comprises, an outer frame structure, a pair of sector shaped grids opposite each other at least one of which is formed with a plurality of alternately spaced adjacent lugs disposed at right angles to each other and extending inwardly to provide drainage space between the grids, and auxiliary frame means removably held within said outer frame structure and edgewise engaging both said grids holding the same together as a unit, said auxiliary frame being of channel shaped profile surrounding respective edge portions of the grids, and comprising an intermediate curved portion engaging the peripheral edge portion, and a pair of end portions engaging the respective radial edge portions of said pair of sector shaped grids.

2. In a filter, the combination which comprises, an outer frame structure, a grid construction including a pair of grids opposite each other and formed with a plurality of alternately spaced adjacent lugs disposed at right angles to each other and extending inwardly from each grid, intermediate partition means located between said spacer lugs defining respective separate drainage space between said partition means and the respective grids, auxiliary frame means edgewise holding said grids as well as the partition means together as a unit located within said outer frame structure, and means for removably holding said unit in said outer frame structure.

3. In a rotary disc filter, the combination which comprises, an outer frame structure, a grid construction including a pair of grids opposite each other, each grid comprising a first group of parallelly arranged spaced ribs of substantial height relative to their thickness, a second group of similar parallelly arranged and spaced ribs intersecting substantially at right angles with said first group of ribs so as to form corresponding rectangular grid openings, with the spacing of the ribs such that said openings represent channels of a length equal to the height of the ribs, each grid having inwardly extending elongated lugs coextensive with respective ribs and of a width not greater than said ribs and located at intersection points of the ribs, and so arranged at right angles with respect to one another that each elongated lug extends at right angles to each lug adjacent thereto, partition means located between said spacer lugs defining respective drainage spaces between said partition means and the respective grids, and mounting means removably holding said grids assembled with said partition means within said outer frame structure.

4. In a continuous filter, a grid comprising a first group of parallelly arranged spaced ribs of substantial height relative to their thickness, a second group of similar parallelly arranged and spaced ribs intersecting substantially at right angles with said first group of ribs so as to form corresponding rectangular grid openings, with the spacing of the ribs such that said openings represent channels of a length equal to the height of the ribs, each grid having inwardly extending elongated lugs coextensive with respective ribs and of a width not greater than said ribs and located at intersection points of the ribs and so arranged at right angles with respect to one another that each elongated lug extends at right angles to each adjacent lug, and plate means supported by said lugs and spaced from said ribs by said lugs and defining a drainage space between the ribs and the plate.

References Cited in the file of this patent

UNITED STATES PATENTS

| | | |
|---|---|---|
| 765,277 | Gerlach | July 19, 1904 |
| 896,436 | Clevenger | Aug. 18, 1908 |
| 1,091,080 | Porges | Mar. 24, 1914 |
| 1,735,007 | Lanes | Nov. 12, 1929 |
| 1,746,409 | Sweetland et al. | Feb. 11, 1930 |
| 2,395,225 | Kurz | Feb. 19, 1946 |
| 2,639,251 | Kracklauer | May 19, 1953 |
| 2,799,397 | Berline | July 16, 1957 |

FOREIGN PATENTS

| | | |
|---|---|---|
| 403,107 | France | Sept. 16, 1909 |
| 869,677 | France | Nov. 17, 1941 |
| 13,586 | Great Britain | of 1902 |